United States Patent [19]

Royce et al.

[11] Patent Number: 4,889,643

[45] Date of Patent: Dec. 26, 1989

[54] QUENCH COOLED PARTICULATE FABRIC SOFTENING COMPOSITION

[75] Inventors: Ralph R. Royce, Milford; Bernard K. Kremer, Cincinnati, both of Ohio; Paul D. Bisio, Ringwood, N.J.

[73] Assignee: The Procter & Gamble Company, Cincinnati, Ohio

[21] Appl. No.: 190,728

[22] Filed: May 5, 1988

[51] Int. Cl.[4] .......... C11D 17/00; B29C 39/02; B29D 24/00

[52] U.S. Cl. .......... 252/8.8; 252/8.6; 252/9 D; 252/528; 252/547

[58] Field of Search .......... 252/8.8

[56] References Cited

U.S. PATENT DOCUMENTS

| | | | |
|---|---|---|---|
| 3,936,537 | 2/1976 | Baskerville, Jr. et al. | 427/242 |
| 4,095,946 | 6/1978 | Jones et al. | 8/137 |
| 4,118,525 | 10/1978 | Jones | 427/242 |
| 4,638,907 | 1/1987 | Bedenk et al. | 252/93 |
| 4,663,198 | 5/1987 | Norris | 427/264 |
| 4,733,774 | 3/1988 | Ping et al. | 8/137 |
| 4,740,326 | 4/1988 | Hortel et al. | 252/90 |

OTHER PUBLICATIONS

Sandvik Rotoform Process Brochure PS-5000 ENG, 2/84.

Sandvik Hot Melt Process Brochure PS-405 ENG, 10/85.

*Primary Examiner*—A. Lionel Clingman

*Attorney, Agent, or Firm*—Leonard Williamson; Robert B. Aylor; Richard C. Witte

[57] ABSTRACT

A detergent-compatible, dryer-released, quench cooled fabric softening composition prepared by quench cooling molten fabric softener on a cooling device, preferably a moving cooled belt.

12 Claims, No Drawings

QUENCH COOLED PARTICULATE FABRIC SOFTENING COMPOSITION

CROSS-REFERENCE TO RELATED APPLICATION

This is a continuation-in-part of commonly assigned U.S. patent application Ser. No. (not known yet), filed Mar. 24, 1988.

FIELD OF THE INVENTION

The invention pertains to fabric softener compositions which are included with detergent in the washing of fabrics. The fabric softener survives the wash and releases softener to the fabrics in a heated laundry dryer.

BACKGROUND OF THE INVENTION

The advantages obtained from the application of fabric conditioning agents (i.e., fabric softeners and/or antistatic agents) to laundered fabrics is well-known. The present invention pertains to particulate softener-/antistatic compositions which survive the wash process and release the active softening/antistatic agent to the laundered fabrics in the dryer.

Fabric softening and antistatic benefits are a desirable part of the laundry process. Softening and antistatic compounds are, in general, quaternary ammonium compounds that are not compatible with anionic surfactants. These compounds will be referred to hereinafter as fabric softening compounds or fabric softeners, although it is to be understood that they deliver both softening and antistatic benefits to fabrics. The opposite electrical charge of the anionic surfactant used in most detergents and the quaternary ammonium fabric softening compounds leads to a mutual attraction which causes precipitation. This, in effect, removes surfactant and fabric softener from solution and reduces the cleaning capacity of the detergent while preventing effective fabric softener deposition on the fabric.

One solution to this incompatibility problem is the separate addition of the fabric softener during either the rinse cycle of the wash or while the fabrics are in the dryer. This increases the inconvenience of using fabric softeners because of the need to add them to a point in the laundering process which is different from that at which the detergent is added.

Various other solutions for this problem of incompatibility between detergent and softening compounds have been proposed in the art. U.S. Pat. No. 3,936,537, Baskerville Jr., issued Feb. 3, 1976, and U.S. Pat. No. 4,095,946, Jones, issued June 20, 1978, both incorporated herein by reference, teach the use of intimate mixtures of organic dispersion inhibitors (e.g., stearyl alcohol and fatty sorbitan esters) with solid fabric softener to improve the survival of the softener in the presence of detergent in the washer so the softener can act on the fabrics when it melts in the dryer. U.S. Pat. No. 4,234,627, Schilling, issued Nov. 18, 1980, teaches microencapsulation of fabric softener. The microcapsules survive the wash and adhere to the fabric surface. They are then ruptured by subsequent tumbling of the fabric in the dryer, thereby releasing softener to the fabrics. Fabric softener prills with a water-insoluble coating are known. However, the commercial production of such softener prills can be very expensive due to low yields.

Likewise, slowly cooling molten fabric softener in trays and grinding to the desired size is a state-of-the-art procedure that can be time consuming and can produce sticky softener particles; particles which are also jagged shaped granules with "fissures".

Thus, there is a continuing need for improved methods and compositions which are more suitable for conveniently and effectively preparing particulate fabric softeners for the home laundering process.

An object of the present invention is to provide a harder softener particulate which has a smooth surface without fissures.

It is also an object of the present invention to provide particulate fabric softener which survives the detergent wash solution and releases the softener to the fabrics at dryer temperatures.

Another object is to provide an improved process for making an improved and less sticky particulate fabric softener.

SUMMARY OF THE INVENTION

The present invention is directed to detergent-compatible, particulate, dryer-activated quench cooled cationic fabric softener having a differential penetration value of at least about 0.1 mm less than a comparable but nonquench cooled fabric softener composition. The particulate fabric softener of the present invention preferably has at least one surface which is substantially smooth or flat. The smooth or flat surface area preferably ranges from about 10% to about 100% of the surface area of the particulate. In another respect, the present invention relates to an improved process for making particulate fabric softener, said process comprising quench cooling molten fabric softener via intimate contact with a solid cooling device.

DETAILED DESCRIPTION OF THE INVENTION

The present invention is directed to detergent-compatible, dryer-activated fabric softening particles comprising a quench cooled cationic fabric softener composition. This invention also relates to a quench cooled fabric softener process for preparing same. The invention also relates to laundry detergent compositions containing said quench cooled softener particles. The quench cooled fabric softener composition (particles) can be added to the wash step of the fabric laundering process.

The process comprises quenching molten fabric softener on a cooling device. The softener is formulated to survive the wash and is released to the fabrics in a heated laundry dryer.

The Quench Cooled Softener Composition

The quench cooled, detergent-compatible, dryer-activated fabric softener composition of this invention comprises from about 70% to about 100% of fabric softener material, at least about 10% of which is a cationic fabric softener. The quench cooled softener composition has a melting point of from about 40° C. to about 80° C., preferably from about 45° C. to about 60° C. The quench cooled softener of the present invention is cooled by intimately contacting the molten fabric softener to a cooling device, preferably a moving belt cooler or a chilled rolls. The molten fabric softener is metered onto the cooling device as a thin film or a particulate where it is solidified in a few seconds.

Preferably, the molten fabric softener is applied to the cooling device as a thin film having a preferred thickness of from about 0.3 mm to about 6.4 mm, more preferably from about 0.4 mm to about 4.4 mm, and most preferably from about 0.5 mm to about 2.5 mm.

While not being bound to any theory, it is believed that a harder, more uniform crystalline softener material is formed via the intimate contact with the cooling device. The differential scanning curve (DSC) of a quench cooled softener is wavier than that of a slow cooled softener. A quench cooled softener is theorized to have a more complex DSC curve than the nonquench cooled softener.

Nonquench cooled softener can be made from molten fabric softener which is conventionally cooled solid in several minutes to several hours or cooled in a spray tower. In a conventional spray tower process, molten fabric softener is cooled quickly, however, such prills are distinguished from the quench cooled softeners of the present invention in that they are not in intimate contact with a solid cooling device. The quench cooled softener of the present invention is harder than comparable prilled fabric softener.

The quench cooled softener composition of this invention has a differential penetration value of at least about 0.1 mm less than a comparable nonquench cooled softener composition. The differential penetration value can be less than 0.2 mm or less than about 0.4 mm. Penetration values herein are measured by ASTM Test D-1321, modified by using a 100 gm weight. Softener prills have numerous air holes and are much softer than the quench cooled and nonquench tray cooled softener because the latter two are more solid.

The quench cooled softener compositions of the present invention can have an absolute penetration value of up to about 2 mm, but preferably less than 1.5 mm, and more preferably about 1 mm or less. Within particle limits, the harder the softener particle the better the handling of the particle for coating and packing purposes. The harder they are the less sticky and the better the handling. In particulate form the quench cooled fabric softener composition can have from 0% to about 30% of a coating surrounding the particulate fabric softener composition. The coating is preferably a substantially water-insoluble material having a melting point above about 35° C. and a penetration value of about 0.6 mm or less.

The quench cooled fabric softener particles preferably have diameters in two ranges. The first is from about 100 microns to about 5,000 microns, preferably from about 300 microns to about 3,000 microns, and most preferably greater than about 500 microns up to about 2,000 microns, with a number average of from about 500 to about 1,200 microns. The other range is from about 5,000 to about 30,000 microns, preferably from about 10,000 to about 20,000 microns, and most preferably from about 12,000 to about 16,000 microns. These "jumbo" softener particles are useful even without quench cooling or the hardness and are particularly useful in pouched product executions using a softener composition disclosed in Example 1 herein. The preferred pouch has two equal pockets containing one-half of a normal wash/dry amount of detergent for the wash and jumbo softener for the dryer. The particles can be of a generally spherical shape, but can have an irregular cubical shape with one or more flat or smooth surfaces. The particle sizes quoted herein refer to the largest dimension (diameter thickness or length) of the particle.

In preparing the quench cooled fabric softener composition of this invention, molten fabric softener is applied onto a quenching device having a temperature below the melting point of the softener composition. The molten softener can be applied to the cooling device in the form of particles, ribbons, sheets, etc., whereby a heat exchange occurring between the cooling device and softener solidifies or quenches the molten softener solid. This "quenching" effect on the softener composition is believed to provide a harder or more crystalline softener. The quenched fabric softener has a greater area under its DSC curve than a comparable slow-cooled softener.

The process itself is more robust, more flexible than prilling, yet provides a superior softener product. The particles made from the quenched fabric softener are more conducive to encapsulation. The quench cooled softener has more flat surfaces than tray cooled softeners. The flat surfaces allow more efficient coating. The processing time is reduced and the yields are high. Some quench cooled processes provide softener particles which are more uniform in size.

The processing window is wider for the process of the present invention than for the processes of the prior art. Glue guns, spray nozzles, etc., can be used to spray the molten softener onto the cooling device to achieve tailored quenched particles. A weir or a similar device can be used to meter a sheet or a ribbon of molten softener onto the cooling device. The solid softener can then ground to a tailored particle size. An electronically controlled pastille-forming apparatus or a screen printer can be used to provide uniform softener particles. These latter methods are very useful for making the "jumbo" softener particles, which are preferably uncoated and contain from about 5% to about 20%, more preferably from about 6% to about 15%, and most preferably from about 8% to about 12% of a water-insoluble stain masking adjuvant, e.g., a silica particle of from about 1 to about 15 microns, preferably from about 2 to about 10 microns. Aerogel is a preferred silica gel. In the light of this disclosure, there are numerous other equivalent variations as will be known to one skilled in the art.

Preferred cooling devices are steel belt coolers and chill rolls. A preferred cooling device commercially available is a Sandvik Rotoform System comprising dropformers or weirs, and a rotating steel belt cooler (Sandvik Process Systems, Inc., Totowa, New Jersey 07512). Another cooling belt manufactured by the Berndorf International Conveyor Belts, Inc., Schaumburg, Ill. 60193. The cooling device must be capable of releasing the quench cooled softener product via doctoring or some other separation means and is thus distinguished from substrate impregnated, cooled softener.

Typical cationic fabric softeners useful herein are quaternary ammonium salts of the formula $$[R_1R_2R_3R_4N]^+Y^-$$

wherein one or two of $R_1$, $R_2$, $R_3$ and $R_4$ groups is an organic radical containing a group selected from a $C_{12}$–$C_{22}$ aliphatic radical or an alkylphenyl or alkylbenzyl radical having from 10 to 16 carbon atoms in the alkyl chain, the remaining groups being selected from $C_1$–$C_4$ alkyl, $C_2$–$C_4$ hydroxyalkyl and cyclic structures in which the nitrogen atom in the above formula forms part of the ring, and Y constitutes an anionic radical such as halide, nitrate, bisulfate, methylsulfate, ethylsulfate and phosphate, to balance the cationic charge.

In the context of the above definition, the hydrophobic moiety (i.e., the $C_{12}$–$C_{22}$ aliphatic, $C_{10}$–$C_{16}$ alkyl phenol or alkylbenzyl radical) in the organic radical $R_1$ or $R_2$ may be directly attached to the quaternary nitrogen atom or may be indirectly attached thereto through an amide, ester, alkoxy, ether, or like grouping.

The quaternary ammonium compounds useful herein include both water-soluble compounds and substantially water-insoluble compounds which are dispersible in water. For example, imidazolinium compounds of the structure.

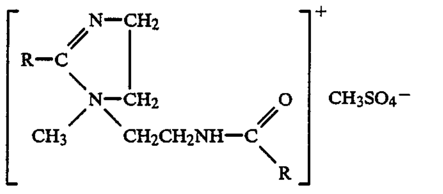

wherein R is a $C_{16}$ to $C_{22}$ alkyl group, possess appreciable water solubility, but can be utilized in the present invention.

The quaternary ammonium softener compounds used in this invention can be prepared in various ways well-known in the art and many such materials are commercially available. The quaternaries are often made from alkyl halide mixtures corresponding to the mixed alkyl chain lengths in fatty acids. For example, the ditallowalkyl quaternaries are made from alkyl halides having mixed $C_{14}$–$C_{18}$ chain lengths. Such mixed di-long chain quaternaries are useful herein and are preferred from a cost standpoint.

The anionic group which can be the counter-ion in the quaternary compounds useful herein is typically a halide (e.g., chloride or bromide), nitrate, bisulfate, ethylsulfate, or methylsulfate. The methylsulfate and chloride ions are the preferred counter-ions from an availability standpoint; while the methylsulfate anion is most preferred because of its minimization of corrosive effects on the automatic clothes dryers in which it is used.

The following are representative examples of quaternary ammonium softening compounds suitable for use in the present invention. All the quaternary ammonium compounds listed can be included in the present invention, but the compilation of suitable quaternary compounds hereinafter is only by way of example and is not intended to be limiting of such compounds. Dioctadecyldimethylammonium methylsulfate is an especially preferred fabric softening compound for use herein, by virtue of its high antistatic, as well as fabric softening activity; ditallowalkyldimethylammonium methylsulfate is equally preferred because of its ready availability and its good antistatic activity; other useful di-long chain quaternary compounds are dicetyldimethylammonium chloride, didocosyldimethylammonium chloride, didodecyldimethylammonium chloride, ditallowalkyldimethylammonium bromide, dioleoyldimethylammonium methylsulfate, ditallowalkyldiethylammonium chloride, ditallowalkyldipropylammonium bromide, ditallowalkyldibutylammonium fluoride, cetyldecylmethylethylammonium chloride, bis-[ditallowalkyldimethylammonium] bisulfate, tris-[ditallowalkyldimethylammonium] phosphate, 1-methyl-1-tallowamidoethyl-2-tallowimidazolinium methylsulfate, and the like. Particularly preferred quaternary ammonium fabric softening compounds are ditallowalkyldimethylammonium chloride and ditallowalkyldimethylammonium methylsulfate.

Coated Quenched Fabric Softener Particles

In a preferred embodiment the fabric softener is the core of particles and comprises from about 70% to about 97% and most preferably about 85% to about 97% of the particle. All percentages herein are "by weight" unless otherwise indicated.

The core composition can consist entirely of cationic fabric softeners, and will generally comprise at least 10%, usually 10% to 50% cationic fabric softener. Optionally, and preferably, the core can contain additional materials such as perfume, auxiliary fabric softening agents (e.g., smectite clay, fatty alcohols and fatty amine, such as ditallowmethyl amine or 1-tallowamidoethyl-2-tallowimidazoline), soil release agents, fabric brighteners, etc. Additional disclosure of materials which can be applied to fabrics along with cationic fabric softening agents in a laundry dryer and, therefore, can be part of the core composition of the particles herein, are disclosed in U.S. Pat. Nos. 4,073,996, Bedenk et al., issued Feb. 14, 1978; 4,237,155, Kardouche, issued Dec. 2, 1980; and 4,421,792, Rudy et al., issued Dec. 20, 1983, all incorporated herein by reference. Preferred additional materials are the encapsulated fabric conditioning perfume microcapsules of U.S. Pat. No. 4,234,627, Schilling, issued Nov. 18, 1980, and British Pat. No. 1,549,432, both of which are incorporated herein by reference. A particularly preferred process for preparing such capsules is disclosed in U.S. Pat. No. 3,697,437, Fogle et al., issued Oct. 10, 1972, incorporated herein by reference. Particle sizes of from about 100 to about 200 microns are preferred.

Preferably, the core has an outer coating which completely surrounds the core and comprises a substantially water-insoluble material having a melting point above 35° C., preferably above 50° C. By "substantially water-insoluble" herein is meant having a solubility in 35° C. water of less than about 50 ppm.

The coating materials are substantially water-insoluble materials, typically (but not necessarily) selected from waxy materials such as paraffinic waxes, microcrystalline waxes, animal waxes, vegetable waxes, saturated fatty acids and fatty alcohols having from 12 to 40 carbon atoms in their alkyl chain, and fatty esters such as fatty acid triglycerides, fatty acid esters of sorbitan and fatty acid esters of fatty alcohols, or from substantially water-insoluble polymers. Typical specific suitable waxy coating materials include lauric, myristic, palmitic, stearic, arachidic and behenic acids, stearyl and behenyl alcohol, microcrystalline wax, beeswax, spermaceti wax, candelilla wax, sorbitan tristearate, sorbitan tetralaurate, tripalmitin, trimyristin and octacosane. A preferred waxy material is stearyl alcohol.

Examples of water-insoluble polymeric materials which may be used for the coating of the particles herein are cellulose ethers such as ethyl, propyl or butyl cellulose; cellulose esters such as cellulose acetate, propionate, butyrate or acetate-butyrate; ureaformaldehyde resins, polyvinyl chloride, polyvinylidene chloride, polyethylene, polypropylene, polyacrylates, polymethacrylates, polymethyl-methacrylates and nylon. Such materials and their equivalents are described in greater detail in any conventional handbook of synthetic organic plastics, for example, in *Modern Plastics Encyclopaedia Volume*, Vol. 62, No. 10A (for 1985–1986) at pages 768–787, published by McGraw- Hill, New York, N.Y. (October 1985), incorporated herein by reference. A preferred polymeric material is ethyl cellulose. The polymeric coating materials can be plasticized with known plasticizing agents such as phthalate, adipate and sebacate esters, polyols (e.g., ethylene glycol), tricresyl phosphate, castor oil and camphor.

The coating surrounds the cationic fabric softener core and is present in an amount of from 0% to about 30%, preferably from about 3% to about 15% by weight of the particle.

The coating material can comprise a mixture of waxy coating materials and polymeric coating materials. In such mixtures the waxy coating material will typically comprise from about 70% to about 90% of the mixture and the polymeric material about 30% to about 10%.

Typically, the coating material will have a hardness which corresponds to a needle penetration value of about 0.6 mm or less, and preferably less than about 0.1 mm, as measured by ASTM Test D-1321, modified by using a 100 g weight instead of a 50 g weight. The test is performed at 25°-27° C. In the case of polymeric coating materials, sample preparation is accomplished by dissolving the polymer in a volatile solvent and then evaporating the solvent after the polymer solution has been placed in the test container. For waxy coating materials, sample preparation is done by melting the sample and then solidifying it in the test container in the manner set forth in the ASTM method.

Penetration values of a number of suitable coating materials are shown in the following table.

TABLE 1

Penetration Values of Representative Coating Materials

| Material | Penetration in mm |
|---|---|
| Stearyl alcohol | 0.57 |
| Ethyl cellulose | 0.09 |
| Cellulose acetate | 0.00 |
| Ethyl cellulose + 10% dibutyl sebacate | 0.00 |
| 70% Stearyl alcohol + 30% $C_{30}$ alcohol | 0.32 |
| 90% Stearyl alcohol + 10% Elvax-4310[1] | 0.12 |
| 90% Stearyl alcohol + 10% BE-Square-195[2] | 0.40 |

[1]Terpolymer of ethylene, vinyl acetate and acid from DuPont
[2]Microcrystalline wax from Petrolite, Specialty Polymers Group The function of the coating which surrounds the fabric softener is to prevent the softener from becoming dissolved and/or dispersed in the wash water when the particles are present during the wash step of a laundry process, and thereby prevent interaction between the fabric softener and the detergent. During the washing and rinsing of the fabrics, a substantial amount of the particles adhere to, or become entrapped within folds of the fabrics. When the fabrics are dried in a heated automatic clothes dryer (typically at temperatures of about 65° to 85° C.), the coating and the fabric softener core composition melt, thereby permitting the softener to spread throughout the fabric load and soften the fabrics.

If the particles are incorporated into a granular detergent composition, it is preferred that the particle size of the softener particles be similar to the particle size of the detergent granule in order to minimize segregation. This will typically be in the range of from about 500 to about 1000 microns. Softener particles which are smaller in size than the detergent granules can be agglomerated to form larger particles to match the particle size of the detergent granules into which they will be incorporated. The agglomeration can be accomplished by using water-soluble or dispersible materials such as polyvinyl alcohol, sodium carboxymethyl cellulose, gelatin and polyoxyethylene waxes. The agglomerates disintegrate when the detergent composition is added to water. Methods and agglomerating agents for agglomeration of fabric softener particles are described in U.S. Pat. No. 4,141,841, McDanald, issued Feb. 27, 1979, incorporated by reference herein.

The particles of softener composition are preferably coated with coating material which is either melted or dissolved in a volatile solvent. The coating is done at a temperature which is below the melting point of the softener composition, and the coated particles are then cooled (or the solvent is evaporated) to solidify the coating. The coating is typically applied in a fluidized bed type apparatus. A suitable type of apparatus is that described in U.S. Pat. No. 3,196,827, Wurster et al., issued July 27, 1965, incorporated by reference herein. In this apparatus, solid softener core particles are suspended on an air stream which carries them in a smooth cyclic flow past the coating nozzle, which sprays them with fluid coating material. Air atomizes and expels the coating fluid through the coating nozzle. The atomized coating fluid covers the surfaces of the core particles. The coated particles are lifted on the air stream and the fluid coating solidifies on the surface of the particles as the air stream lifts them away from the nozzle. The particles then settle out of the air stream and begin another cycle which takes them past the nozzle again. The process is repeated until the desired amount of coating has been deposited on the particles. The amount of coating applied to the softener core particles is typically from about 3% to about 30%, preferably about 3% to about 15% by weight of total particle (i.e., core plus coating).

Alternatively, other types of encapsulating processes such as described in an article by Nack entitled "Microencapsulation Techniques, Applications and Problems," J. Soc. Cos. Chem., Vol. 21, Pages 85-98 (Feb. 4, 1970), incorporated herein by reference, can be used. When perfume microcapsules are incorporated, the processes disclosed in U.S. Pat. No. 4,234,627, supra, incorporated herein by reference, can be used.

If it is desired to aggomerate the softener particles, this can be accomplished in the following manner. The softener particles are fed to a highly efficient mixer (e.g., Schugi Flexomix Model 160,335 or 400 from Schugi Process Engineers USA, 41-T Tamarack Circle, Skillman, New Jersey 08558), or a pan agglomerator. Aqueous solution or dispersion of agglomerating agent is sprayed onto the moving particles causing them to stick to each other. The water is evaporated and the dried agglomerated particles are sized by sieving. Suitable agglomerating agents include dextrin starches, Pluronic Polyols (copolymers of ethylene oxide and/or propylene oxide with either ethylene glycol or propylene glycol) and hydratable salts such as sodium tripolyphosphate or sodium sulfate.

The type of apparatus described in U.S. Pat. No. 3,196,827 (Wurster et al.), cited supra, can also be used for agglomerating particles.

Detergent Compositions

The particles of the present invention are preferably formulated into detergent compositions. Such compositions typically comprise detersive surfactants and detergency builders and, optionally, additional ingredients such as bleaches, enzymes, fabric brighteners and the like. The particles are present in the detergent composition at a level sufficient to provide from about 0.5% to about 10%, and preferably from about 1% to about 5% of quaternary ammonium fabric softener in the detergent composition. The remainder of the detergent composition will comprise from about 1% to about 50%, preferably from about 10% to about 25% detersive surfactant, and from about 15% to about 60%, preferably from about 20% to about 45% of a detergency builder, and, if desired, other optional laundry detergent components.

1. The Surfactant

Surfactants useful in the detergent compositions herein include well-known synthetic anionic, nonionic, amphoteric and zwitterionic surfactants. Typical of these are the alkyl benzene sulfonates, alkyl- and alkylether sulfates, paraffin sulfonates, olefin sulfonates, alkoxylated (especially ethoxylated) alcohols and alkyl phenols, amine oxides, alpha-sulfonates of fatty acids and of fatty acid esters, alkyl betaines, and the like, which are well known from the detergency art. In general, such detersive surfactants contain an alkyl group in the $C_9$–$C_{18}$ range. The anionic detersive surfactants can be used in the form of their sodium, potassium or triethanolammonium salts; the nonionics generally contain from about 5 to about 17 ethylene oxide groups. $C_{11}$–$C_{16}$ alkyl benzene sulfonates, $C_{12}$–$C_{18}$ paraffin-sulfonates and alkyl sulfates are especially preferred in the compositions of the present type.

A detailed listing of suitable surfactants for the detergent compositions herein can be found in U.S. Pat. No. 3,936,537, Baskerville, issued Feb. 3, 1976, incorporated by reference herein. Commercial sources of such surfactants can be found in McCutcheon's EMULSIFIERS AND DETERGENTS, North American Edition, 1984, McCutcheon Division, MC Publishing Company, also incorporated herein be reference.

2. Detergency Builders

Useful detergency builders for the detergent compositions herein include any of the conventional inorganic and organic water-soluble builder salts, as well as various water-insoluble and so-called "seeded" builders.

Nonlimiting examples of suitable water-soluble, inorganic alkaline detergent builder salts include the alkali metal carbonates, borates, phosphates, polyphosphates, tripolyphosphates, bicarbonates, silicates, and sulfates. Specific examples of such salts include the sodium and potassium tetraborates, bicarbonates, carbonates, tripolyphosphates, pyrophosphates, and hexametaphosphates.

Examples of suitable organic alkaline detergency builder salts are: (1) water-soluble amino polyacetates, e.g., sodium and potassium ethylenediaminetetraacetates, nitrilotriacetates, and N-(2-hydroxyethyl)nitrilodiacetates; (2) water-soluble salts of phytic acid, e.g., sodium and potassium phytates; (3) water-soluble polyphosphonates, including sodium, potassium and lithium salts of ethane-1-hydroxy-1,1-diphosphonic acid, sodium, potassium, and lithium salts of methylenediphosphonic acid and the like.

Seeded builders include such materials as sodium carbonate or sodium silicate, seeded with calcium carbonate or barium sulfate.

A detailed listing of suitable detergency builders can be found in U.S. Pat. No. 3,936,537, supra, incorporated herein by reference.

3. Optional Detergent Ingredients

Optional detergent composition components include enzymes (e.g., proteases and amylases), halogen bleaches (e.g., sodium and potassium dichloroisocyanurates), peroxyacid bleaches (e.g., diperoxydodecane-1,12-dioic acid), inorganic percompound bleaches (e.g., sodium perborate), activators for perborate (e.g., tetraacetylethylenediamine and sodium nonanoyloxybenzene sulfonate), soil release agents (e.g., methylcellulose) soil suspending agents (e.g., sodium carboxymethylcellulose) and fabric brighteners.

Pouched Products

When free fabric softener particles of the invention are added to the wash step of a laundering process, it is inevitable that some of the particles will not adhere to or become trapped in the folds of the fabric and will, therefore, be lost in the discarded wash solution or rinse water. In order to avoid such loss, the particles can be added to the wash solution in a sealed, porous water-insoluble pouch such as the type described in U.S. Pat. No. 4,223,029, Mahler et al., issued Sept. 16, 1980, incorporated by reference herein. Detergent granules can be included in the pouch with the softener particles. When the pouch is placed in water in the wash step of the laundering process, the detergent dissolves, but the softener particles remain in the pouch. The pouch remains with the fabrics through the wash and rinse. When the pouch is tumbled with the fabrics in the dryer, the softener particles release the softener, which melts onto the pouch material and is transferred from the pouch material to the fabrics as the pouch comes into contact with the fabrics during the drying cycle. Preferred pouch structures are multi-pouch porous sheet structures such as described in U.S. Pat. No. 4,638,907, Bedenk/Harden, issued Jan. 27, 1987, incorporated herein by reference. A single pouch structure can also be used. Several examples are currently on the market.

Some preferred pouches and detergent compositions are disclosed in commonly assigned and allowed U.S. patent application Ser. No. 005,802, filed Jan. 16, 1987, Ping/Beard, now U.S. Pat. No. 4,733,774, issued Mar. 29, 1988, entitled "Glue Patterned Substrate for Pouched Particulate Fabric Softener Laundry Product"; and U.S. patent application Ser. No. 017,103, Hortel/Clauss/Williamson, filed Feb. 19, 1987, now U.S. Pat. No. 4,740,326, issued Apr. 26, 1988, entitled "A Soil Release Polymer Coated Substrate Containing a Laundry Detergent for Improved Cleaning Performance"; both incorporated herein by reference in their entirety.

Suitable pouch materials include, paper, nonwoven synthetics such as spunbonded and wet laid polyester, and porous formed film plastic sheet material. Suitable formed plastic film material is disclosed in commonly assigned U.S. Pat. No. 4,679,643, Curro and Linman, issued Dec. 16, 1986. Said film has finely divided apertures smaller than most of the particulate materials inside and is capable of surviving the wash and dryer temperatures.

The invention will be illustrated by the following nonlimiting examples.

EXAMPLE I

Molten fabric softener which has a melting point of about 54° C. is prepared using the following formula:

| Ingredient | Wt. % |
|---|---|
| Ditallowdimethylammonium methylsulfate (DTDMAMS) | 44 |
| Sorbitan monostearate | 22 |
| Cetyl alcohol | 22 |
| Syloid ® 234 (silica gel) | 12 |
| Total | 100 |

The DTDMAMS is heated in a reaction vessel at 71° C. under vacuum (Ca. 710 mm Hg) for 4 hours to remove residual moisture and/or isopropanol. The cetyl alcohol and sorbitan monostearate are then added, and the molten "triblend" is mixed for one hour at about 71° C.

The triblend is transferred into a Ross Versamix mixer (Charles Ross & Sons Company, Hauppauge, New York 11788). The temperature of the triblend is then raised to 79°-85° C. under vacuum (about 330-430 mm Hg). When the temperature has stabilized in this range, the Ross anchor and disperser are turned on and the Syloid 234 is added. The mixture is blended for 5 minutes and then sheared with the Ross colloid mixer for 20 minutes. (Some of the molten softener composition is poured into trays and cooled overnight in a 4° C. room. Thickness: 1.5 mm. This is used as a control.)

The molten softener mixture is transferred or pumped to the head of a steel belt cooler via heated piping. The softener is placed on the moving steel belt cooler, a Sandvik Process System belt (Sandvik Process Systems, Inc., Totowa, N.J. 07512) directly from the piping, via a distribution bar or a distribution piping across the width of the belt. A weir is used to meter the molten softener in the form of a 0.06 inch (1.5 mm) thick film onto the moving cooled belt. The belt is cooled via waterjets underneath the belt. The temperature range in the first meter zone is from 32°-38° C., the second zone from 20°-32° C., and the third zone from 10°-20° C. and combinations. Each zone is about 5 meters. The length of the belt is 18 meters. The belt is moving at a rate of about 40 feet (13 meters/min.) per minute, but can be adjusted to a rate of from about 30 to 80 feet per minute (9 to 25 meters per minute). The molten softener becomes solid film in about 40 seconds.

The film of softener traveling along the belt is quenched below its melting point, in this case the quenching temperature is below 32° C. The object is to quench the softener while maintaining intimate contact between the softener and the belt. Separation of the softener (curling up) by instantaneous quenching still produces a superior softener product. However, it is desirable to meter the softener onto the cooled belt at a temperature which will maintain maximum contact with the belt during the entire quenching process.

Quench cooled softener is released from the cooling belt by a doctoring device at the end of the belt and is delivered to a prebreaker, which breaks the solidified film into particles less than 4 inches (10.16 cm) in diameter.

However, some of the quench cooled softener is taken after being doctored off the belt but before prebreaking the sample to measure the hardness of the softener film.

The quench cooled softener of this example had a penetration value of about 0.8 mm and the above-mentioned overnight cooled controlled fabric softener had a penetration value of about 1 mm. A 0.1 mm difference penetration is a significant difference.

The solid quenched softener prebreak is then converted to particles by milling in a Fitzmill, Model DAS06 (The Fitzpatrick Company, Elmhurst, Ill. 60126) at 4740 rpm's through a 4 mesh screen. The particles are then sized through 12 on 30 (U.S. Standard screens, 1.7-0.6 mm particle size). The particles of this example are cubical in shape with one or two flat surfaces. There are little or no fissures on the particle surfaces.

EXAMPLE II

To improve the hot water wash survivability of the softener, the particles of Example I are coated with a hot melt of fatty alcohol-based coating. The coating is a mixture of 90% stearyl alcohol and 10% Elvax-4310, a terpolymer of ethylene, vinyl acetate and acid from E.I. du Pont de Nemours & Co., Polymer Products Dept., 1007 Market St., Wilmington, Del. 19898. The coating is applied in an 18 Inch Wurster coater (Coating Place, Inc., P.O. Box 248, Verona, Wis. 53593). A detailed description of this type of equipment can be found in U.S. Pat. No. 3,196,827, supra, incorporated by reference herein.

Briefly, the Wurster Coater consists of an apparatus that is capable of suspending the softener core particles on a rapidly moving warm air stream. Encapsulation is accomplished by passing the quench cooled softener particles through a zone of finely atomized droplets of coating. As the particles move up and away from the coating nozzle, the coating begins to solidify as the particles cool. When the particles can no longer be fluidized by the air stream, they move down in the opposite direction of the fluidizing air. The coated particles then reenter the coating zone and are recycled until the desired amount of coating is applied. The coating cycle takes place within a single chamber which preferably has a partition to separate the particles moving up through the coating zone from those moving down through the cooling zone.

The following conditions are used to apply a hot melt coating:

| Stearyl Alcohol/Elvax | |
|---|---|
| Temperature | 79° C. |
| Fluidizing Air | 15.8 Cu.M/min. at 40.5° C. |
| Atomizing Air Volume | 0.25 Cu.M/min. |
| Atomizing Air Rate | 4218 g/sq. cm. |
| Inlet Air Temperature | 20° C.-38° C. |
| Outlet Air Temperature | 20° C.-38° C. |
| Pump Rate | 0.2 Kg/min. |
| Nozzle Size | CPI-18-A74* |
| Partition Size | 216 mm × 267 mm |
| Partition Gap | 19 mm |
| Run Time | 22 min. |

*Available from Coating Place, Inc.

The amount of fatty alcohol coating applied to the quench cooled softener particles is about 15% by weight of the total coated particle. After the coating process is complete the particles are resized through 12 on 20 mesh and are then ready for use "as is" or for blending into detergent granules.

EXAMPLE III

Quench cooled softener core particles prepared as in Example I are coated with ethyl cellulose based coating instead of fatty alcohol. The particles are coated with a 10% solution of Ethocel in methanol. The coating is applied in an 18 inch Wurster Coater (Coating Place, Inc., P.O. Box 248, Verona, Wis. 53593). The ethyl cellulose used is Ethocel Std. 10 (Dow Chemical Co., Midland, Mich. 48640), which has an Ubbelohde viscosity of 9.0–11.0, measured at 25° C. as a 5% solution in 80% toluene/20% ethanol.

The following conditions are used to apply the cellulose-based coating:

| | |
|---|---|
| Fluidizing Air | 15.8 Cu.M/min. at 40.5° C. |
| Atomizing Air Volume | 0.37 Cu.M/min. |
| Atomizing Air Rate | 5624 g/sq.cm. |
| Inlet Air Temperature | 38° C.–43° C. |
| Outlet Air Temperature | 30° C.–32° C. |
| Pump Rate | 0.2 Kg/min. |
| Nozzle Size | CPI-18-A74* |
| Partition Size | 216 mm × 267 mm |
| Partition Gap | 19 mm |
| Run Time | 55 min. |

*Available from Coating Place, Inc.

The amount of ethyl cellulose solids coated onto the particles is about 3% by weight of the total coated particle weight. When the coating is completed, the softener particles are resized through 11 on 26 Mesh U.S. Standard screens and are then ready for use "as is" or for blending into detergent granules.

EXAMPLE IV

A granular detergent/softener composition is prepared by mixing 4 parts of the quench cooled softener particles of either Example I, II or III with 96 parts of the following granular detergent composition.

| Ingredient | Wt. % |
|---|---|
| Sodium $C_{13}$ linear alkylbenzene sulfonate | 16.5 |
| Sodium $C_{14}$—$C_{15}$ linear fatty alcohol sulfate | 16.5 |
| Sodium sulfate | 23.8 |
| Sodium silicate | 9.2 |
| Polyethylene glycol | 0.9 |
| Polyacrylic acid | 1.3 |
| Sodium tripolyphosphate | 13.7 |
| Sodium carbonate | 4.8 |
| Methyl cellulose | 3.6 |
| Optical brightener | 1.3 |
| Protease enzyme | 1.6 |
| Moisture and miscellaneous | 6.8 |
| Total | 100.0 |

EXAMPLE V

A granular bleach/softener composition is prepared by mixing 4 parts of the quench cooled softener particles of either Example I, II or III with 96 parts of the following granular bleach composition.

| Ingredient | Wt. % |
|---|---|
| Diperoxydodecanedioic acid | 24.0 |
| Dodecanedioic acid | 2.9 |
| Sodium $C_{13}$ linear alkylbenzene sulfonate | 5.5 |
| Boric acid | 27.7 |
| Sodium sulfate | 39.7 |
| Miscellaneous | 0.2 |
| Total | 100.0 |

EXAMPLE VI

A laundering article in the form of a multipouch sheet is prepared as follows.

The sheet is comprised of two sheets of Reemay$^R$ 2420 spunbonded polyester (DuPont, Wilmington, Del.). In between the sheets is a honeycomb web made from polyethylene. The web has a thickness of approximately 0.04 inch (0.10 cm) and the cells of the web are diamond shaped, having a cross dimension of approximately 0.19 inch (0.48 cm) and a length dimension of approximately 0.63 inch (1.60 cm). The three-layered structure has outer edge dimensions of approximately 4.5 inches×11 inches (11.4 cms×27.9 cms). The structure is laminated together in a pattern so as to form six equal sized pouches, two pouches at each end containing about 14.7 grams each of the bleach/quench cooled softener composition of Example III and the four pouches in between containing about 15.5 grams each of the detergent/quench cooled softener composition of Example IV.

The article is suitable for washing and softening laundry in a process involving washing and rinsing the fabrics, followed by tumble drying in a heated clothes dryer, wherein the article remains with the laundry throughout the entire process.

EXAMPLE VII

This example is the same as Example VI, except that (1) the softener and detergent levels are, respectively, 2.2 parts and 97.8 parts, (2) the softener and bleach levels are, respectively, 2.6 parts and 97.4 parts; and (3) the multipouched sheet is comprised of a top sheet of a latex bonded, wet laid polyester/wood pulp substrate (James River 5227, James River Corp., Greenville, S.C.) and an embossed sheet of Reemay$^R$ 2420, a spunbonded polyester (Dupont, Wilmington, Del.). The two sheets are laminated together with an outer edge dimension of approximately 4.5 inches×11 inches (11.4×27.9 cms) and with a pattern so as to form six equal sized pouches. The two pouches at each end are filled with about 14.7 grams of the bleach/ethyl cellulose coated softener composition of Example III and the four pouches in between are filled with about 15.5 grams of the detergent/ethylcellulose coated softener composition of Example III.

When a dusty detergent powder is used in a pouched sheet, as set forth above, the porous substrates may not be able to contain the dust adequately. One solution to this problem is to spray the inside of the detergent pouches with a wetting agent selected from suitable, relatively nonvolatile, organic liquids like water, surfactant solutions, propylene or ethylene glycol, light oils, liquid polyethylene glycols, nonionic surfactants, etc., capable of forming and maintaining a tacky surface on the detergent powder particles. Said liquid should not be capable of forming, by itself, a barrier of any type between the substrate and the detergent composition. The portion of the substrate that defines the pouch that contains the detergent powder is sprayed with an effective amount, typically from about 0.01 gram to about 0.2 gram per square inch, preferably from about 0.04 gram to about 0.1 gram per square inch, of said wetting agent. The detergent powder is added to the detergent pouch before the wetting agent evaporates or otherwise disappears. The tacky detergent powder then obstructs, at least partially, the pores of the substrate, and thus minimizes the escape of the very fine detergent powder particles (dust). The porous substrate in this Example is coated with approximately 0.06 gram per square inch of organic liquid (propylene glycol) and, before it dries, the detergent powder is added to the sheet.

The finished article is suitable for washing and softening laundry in a process involving washing and rinsing the fabrics, followed by tumble drying in a heated clothes dryer, wherein the article remains with the laundry throughout the entire process.

What is claimed is:

1. A particulate, detergent-compatible, dryer-activated, quench cooled fabric softener composition comprising at least about 10% of a cationic fabric softener, the said softener composition having a melting point of from about 40° C. to about 80° C.; wherein the cationic softener is of the formula $$[R_1R_2R_3R_4N]^+Y^-$$

wherein one or two of the $R_1$, $R_2$, $R_3$ and $R_4$ groups is an organic radical containing a group selected from $C_{12}$–$C_{22}$ aliphatic radicals, alkyl phenyl radicals having from 10 to 16 carbon atoms in the alkyl chain, and alkylbenzyl radicals having from 10 to 16 carbon atoms in the alkyl chain, the remaining groups being selected from $C_1$–$C_4$ alkyl, $C_2$–$C_4$ hydroxyalkyl, and cyclic structures in which the nitrogen atom in the formula forms part of a ring, and wherein $Y^-$ is an anionic radical, and wherein the cationic softener comprises from about 10% to about 50% of the softener composition.

2. The particulate detergent-compatible, dryer-activated, quench cooled fabric softener composition of claim 1 wherein said particulate has from about 3% to about 30% of a coating; said coating being a substantially water-insoluble material having a melting point above about 35° C. and a penetration value of about 0.6 mm or less as measured by ASTM Test D-1321, modified by using a 100 gram weight; wherein said water-insoluble material is selected from the group consisting of: waxes, fatty alcohols, fatty acids, fatty esters, cellulose ethers and mixtures thereof.

3. The detergent-compatible, dryer-activated, quench cooled fabric softener composition of claim 2 wherein said particulate has a particle size of from about 100 to about 5,000 microns.

4. The particulate of claim 3 wherein the particle size is from about 3,000 to about 5,000 microns.

5. The particulate of claim 3 wherein said size is from about 300 to about 2,000 microns.

6. A product comprising a water-insoluble, water-permeable pouch and a particulate dryer-activated quench cooled fabric softener composition of claim 1 contained in said pouch.

7. The product according to claim 6 wherein said pouch also contains a laundry wash cycle component selected from detergents and bleaches.

8. A process for making a detergent-compatible, dryer-activated fabric softener composition of claim 1 comprising the steps of:

1. forming the molten fabric softener composition of claim 1 and
2. intimately contacting said molten fabric softener composition with cooling device; wherein said molten fabric softener is quench cooled to a temperature low enough to solidify said molten fabric softener within from about 1 second to about 60 seconds.

9. A quench cooled fabric softener composition made according to the process of claim 8.

10. The process of claim 8 wherein said molten fabric softener has a Step 1 temperature of from about 40° C. to about 100° C.; and wherein the quenching temperature of Step 3 is from about 4° C. to about 38° C.; and said quenching time is from about 20 seconds to about 40 seconds.

11. The process of claim 8 wherein the quenching in Step 3 is done by casting the molten fabric softener of Step 1 on a cooling device selected from moving cooled belts and chilled rolls, wherein said cooling device has at least one cooling zone having a temperature of from about 32° C. to about 38° C.; and wherein said casted molten fabric softener is cast in a form selected from sheets, ribbons, pastilles, spray granules or screen printed particles.

12. The process of claim 8 wherein said molten fabric softener has a Step 1 temperature of from about 45° C. to about 80° C.; and said quenching temperature is from about 10° C. to about 30° C.

* * * * *